United States Patent
Tomomori et al.

(10) Patent No.: US 11,223,069 B2
(45) Date of Patent: Jan. 11, 2022

(54) SURFACE-TREATED STEEL SHEET FOR BATTERY CASES, BATTERY CASE AND BATTERY

(75) Inventors: Tatsuo Tomomori, Yamaguchi (JP); Eiji Yamane, Yamaguchi (JP); Shinichirou Horie, Yamaguchi (JP); Koh Yoshioka, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 14/114,479

(22) PCT Filed: Apr. 26, 2012

(86) PCT No.: PCT/JP2012/061192
§ 371 (c)(1),
(2), (4) Date: Oct. 28, 2013

(87) PCT Pub. No.: WO2012/147843
PCT Pub. Date: Nov. 1, 2012

(65) Prior Publication Data
US 2014/0050971 A1    Feb. 20, 2014

(30) Foreign Application Priority Data

Apr. 28, 2011 (JP) .............................. JP2011-100538

(51) Int. Cl.
| | | |
|---|---|---|
| H01M 10/28 | (2006.01) | |
| C25D 5/50 | (2006.01) | |
| H01M 50/116 | (2021.01) | |
| H01M 50/124 | (2021.01) | |
| C25D 5/14 | (2006.01) | |
| H01M 10/30 | (2006.01) | |
| C25D 3/56 | (2006.01) | |
| C25D 3/12 | (2006.01) | |

(52) U.S. Cl.
CPC .............. *H01M 10/28* (2013.01); *C25D 5/14* (2013.01); *C25D 5/50* (2013.01); *H01M 50/116* (2021.01); *H01M 50/124* (2021.01); *C25D 3/12* (2013.01); *C25D 3/562* (2013.01); *H01M 10/30* (2013.01); *H01M 50/1245* (2021.01); *H01M 2300/0014* (2013.01)

(58) Field of Classification Search
CPC ...... H01M 2/02; H01M 10/28; H01M 50/124; H01M 50/116; H01M 50/1245; C25D 5/14; C25D 5/50
See application file for complete search history.

(56) References Cited

U.S. PATENT DOCUMENTS

| | | | | |
|---|---|---|---|---|
| 6,165,640 A | * | 12/2000 | Sugikawa | B21D 22/21 429/164 |
| 2003/0077510 A1 | * | 4/2003 | Ohmura | C23C 28/021 429/176 |
| 2007/0181232 A1 | * | 8/2007 | Han | C21D 9/46 148/603 |
| 2008/0292957 A1 | * | 11/2008 | Tomomori | C23C 18/32 429/176 |

FOREIGN PATENT DOCUMENTS

| | | | |
|---|---|---|---|
| CN | 1170782 A | 1/1998 | |
| CN | 1647293 A | 7/2005 | |
| ER | 1 498 963 A1 | 1/2005 | |
| JP | 09-306439 A | 11/1997 | |
| JP | 2003-017010 A | 1/2003 | |
| JP | WO 2005056885 A1 * | 6/2005 | ............. C25D 3/562 |
| JP | 2006-257543 A | 9/2006 | |
| JP | 206-351434 A | 12/2006 | |
| JP | 2007-122940 A | 5/2007 | |
| JP | 2007122940 A * | 5/2007 | |
| JP | 2009-129664 A | 6/2009 | |
| JP | 2012-048958 A | 3/2012 | |
| WO | WO 97/42667 A1 | 11/1997 | |

OTHER PUBLICATIONS

JP2007122940A Original and Translation from Espacenet (Year: 2007).*
Office Action dated May 5, 2015 in corresponding CN Application No. 201280027900.4 and an English language translation thereof.
Office Action dated Nov. 16, 2016 in corresponding Chinese Patent Application No. 201280027900.4.
Office Action dated Apr. 19, 2016 in corresponding Chinese Patent Application No. 201280027900.4.
Office Action dated Apr. 19, 2016 in corresponding Chinese Official Action Patent Application No. 201280027900.4 with English Language Translation (1 page).
Office Action dated Aug. 10, 2017 in corresponding KR patent application No. 10-2013-7030961 with English language translation (8 pages).
An Official Action from corresponding European Application No. 12 777 248.1 dated Mar. 23, 2017; 3 pgs.
Office Action dated Oct. 20, 2015 in corresponding CN patent application No. 201280027900.4 with English language translation (10 pgs.).
Office Action dated Oct. 29, 2015 in corresponding EU patent application No. 12777248.1 (4 pgs.).
Office Action dated Dec. 1, 2015 in corresponding JP patent application No. 2013-512425 (4 pgs.).

* cited by examiner

*Primary Examiner* — Barbara L Gilliam
*Assistant Examiner* — Nathanael T Zemui
(74) *Attorney, Agent, or Firm* — Muncy, Geissler, Olds & Lowe, P.C.

(57) ABSTRACT

A surface-treated steel sheet for battery cases is provided which comprises a nickel-cobalt alloy layer formed at the outermost surface of a plane to be an inner surface of a battery case, wherein a Co/Ni value at the surface of the nickel-cobalt alloy layer is within a range of 0.1 to 1.5 as determined by Auger electron spectroscopy analysis.

4 Claims, No Drawings

SURFACE-TREATED STEEL SHEET FOR BATTERY CASES, BATTERY CASE AND BATTERY

TECHNICAL FIELD

The present invention relates to a surface-treated steel sheet for battery case, a battery case obtained by using the surface-treated steel sheet for battery cases, and a battery obtained by using the battery case.

BACKGROUND ART

In recent years, portable gadgets such as audio devices and mobile phones are used in various fields, and as power sources therefor, primary batteries such as alkaline batteries and secondary batteries such as nickel hydride batteries and lithium-ion batteries are widely used. These batteries are required to have enhanced performance such as high output and long life, and battery cases, in which electric generating elements such as positive electrode active materials and negative electrode active materials are accommodated, are also required to be improved in their performance as important constitutional elements of batteries. In this respect, as materials for such battery cases, materials are desired which have excellent resistance to dissolving in strong alkaline electrolyte and can achieve enhanced battery performance.

In addition, application of a conductive layer to the inner surface of a battery case is recently omitted in order to reduce volatile organic solvent, and hence, as the material for such a battery case, a material is desired which can maintain battery properties at a high level over time even without being formed thereon with any conductive film. For example, Patent Document 1 proposes, as such a material for battery cases, a plated steel sheet obtained by forming a nickel plated layer and a cobalt plated layer in this order on the surface of a steel sheet. In particular, Patent Document 1 is for the purpose of forming the cobalt plated layer as the uppermost layer to improve the conductivity at the surface layer of the plated steel sheet thereby also improving the battery properties even without forming any conductive layer.

PRIOR ART DOCUMENTS

Patent Documents

Patent Document 1: Published Patent Application No. 2009-129664

SUMMARY OF THE INVENTION

Problem to be Solved by the Invention

As a result of researches by the present inventors, however, there have been recognized some problems, such as that cobalt dissolves over time and this dissolution of cobalt may possibly cause gas generation in the internal of the battery thereby no result in occurrence of liquid leakage, if the plated steel sheet disclosed in the above Patent Document 1 is used as a battery case for a battery, such as alkaline battery or nickel hydride battery, which employs a strong alkaline electrolyte.

An object of the present invention is to provide a surface-treated steel sheet for battery cases which has excellent resistance to dissolving in alkaline solution, such as potassium hydroxide solution, as a strong alkaline electrolyte and which can ensure high battery properties comparable with or higher than those of prior art even after a lapse of time. In addition, another object of the present invention is to provide a battery case and a battery which are obtained by using such a surface-treated steel sheet for battery cases.

Means for Solving the Problems

As a result of intensive studies to achieve the above objects, the present inventors have found that the above objects can be achieved by forming a nickel-cobalt alloy layer at the outermost surface of a plane to be an inner surface of a battery case such that a Co/Ni value at the surface is within a range of 0.1 to 1.5 as determined by Auger electron spectroscopy analysis, and accomplished the present invention.

That is, according to the present invention, there is provided a surface-treated steel sheet for battery cases, comprising a nickel-cobalt alloy layer formed at the outermost surface of a plane to be an inner surface of a battery case, wherein a Co/Ni value at the surface of the nickel-cobalt alloy layer is within a range of 0.1 to 1.5 as determined by Auger electron spectroscopy analysis.

In the surface-treated steel sheet for battery cases according to the present invention, it is preferred that an immersion potential of the nickel-cobalt alloy layer in potassium hydroxide aqueous solution at 60° C. is within a range of −0.4 to −0.02 V relative to an immersion potential of a nickel simple body in potassium hydroxide aqueous solution at 60° C.

Preferably, the surface-treated steel sheet for battery cases has a nickel layer as an underlying layer for the nickel-cobalt alloy layer.

Preferably, the surface-treated steel sheet for battery cases has an iron-nickel diffusion layer and/or an iron-nickel-cobalt diffusion layer between the nickel-cobalt layer and the steel sheet.

According to the present invention, there is provided a battery case obtained by shape-forming the above surface-treated steel sheet for battery cases.

In addition, according to the present invention, there is provided a battery configured using the above battery case.

Effects of the Invention

According to the present invention, by forming a nickel-cobalt alloy layer at the outermost surface of a plane to be an inner surface of a battery case such that a Co/Ni value at the surface is within a range of 0.1 to 1.5 as determined by Auger electron spectroscopy analysis, there can be provided a surface-treated steel sheet for battery cases which has excellent resistance to dissolving in alkaline solution and which can ensure high battery properties comparable with or higher than those of prior art even after a lapse of time, and also provided a battery case and a battery which are obtained by using the surface-treated steel sheet for battery cases.

EMBODIMENTS FOR CARRYING OUT THE INVENTION

The surface-treated steel sheet for battery cases according to the present invention will hereinafter be described.

The surface-treated steel sheet for battery cases according to the present invention comprises a nickel-cobalt alloy layer formed at the outermost surface of a plane to be an inner surface of a battery case, and has a feature that a Co/Ni value at the surface of the nickel-cobalt alloy layer is within a range of 0.1 to 1.5 as determined by Auger electron spectroscopy analysis.

<Steel Sheet>

A steel sheet as a base sheet of the surface-treated steel sheet for battery cases according to the present invention is not particularly limited so long as it has excellent drawing workability, drawing and ironing workability, or workability in drawing and thin redrawing (DTR). For example, steel sheets may be used, such as formed of low-carbon aluminum-killed steel (carbon amount of 0.01 to 0.15 wt %), extra-low-carbon steel of carbon amount of 0.003 wt % or less, or non-aging extra-low-carbon steel obtained by further adding Ti or Nb to extra-low-carbon steel.

In the present invention, a hot-rolled sheet of the above steels is subjected to acid pickling to remove scale (oxide film) on the surface thereafter being cold-rolled, followed by electrolytic cleaning for rolling oil, annealing, and temper rolling in this order, thereby being used as the base sheet. The annealing in this case may be, such as, but not limited to, continuous annealing or batch-type annealing.

<Nickel-Cobalt Alloy Layer>

The surface-treated steel sheet for battery cases according to the present invention is configured such that a nickel-cobalt alloy layer is formed at the outermost surface of a plane to be an inner surface of a battery case. The nicker-cobalt alloy layer is such that the Co/Ni value (molar ratio of Co/Ni) at the surface thereof is within a range of 0.1 to 1.5, preferably 0.1 to 1.2, and more preferably 0.2 to 0.8, as determined by Auger electron spectroscopy analysis.

In the present invention, the Co/Ni value as determined by Auger electron spectroscopy analysis at the surface of the nickel-cobalt alloy layer is controlled within the above certain range, and the resistance to dissolving in alkaline solution, such as potassium hydroxide solution, as a strong alkaline electrolyte can thereby be improved. This allows to ensure high battery properties while suppressing gas generation even after a Lapse of time.

In particular, the present inventors have found that, if the Co/Ni value as determined by Auger electron spectroscopy analysis at the surface of the nickel-cobalt alloy layer is controlled within the above ranges, then it is possible to sufficiently enhance the conductivity of the nickel-cobalt alloy layer while suppressing the dissolution of cobalt when it is immersed in alkaline solution, so that the resistance to dissolving in alkaline solution can be improved and gas generation can be suppressed even after a lapse of time, thus accomplished the present invention.

If the Co/Ni value as determined by Auger electron spectroscopy analysis is unduly low, then advantageous effect of improving battery properties cannot sufficiently be obtained. If, on the other hand, the Co/Ni value is unduly high, then the nickel-cobalt alloy layer may have poor resistance to dissolving in alkaline solution thereby to cause dissolution of cobalt when being contacted with alkaline solution, so that the gas generation will be significant after a lapse of time.

Note that the Co/Ni value as determined by Auger electron spectroscopy analysis in the present invention can be measured in accordance with the method below, for example. That is, first, measurement is conducted using a scanning-type Auger electron spectroscopy (AES) analyzer for the surface of the nickel-cobalt alloy layer, and at % (atomic percent) values of Ni and Co at the surface of the nickel-cobalt alloy layer are calculated. More specifically, five locations on the surface of the nickel-cobalt alloy layer are subjected to the measurement using a scanning-type Auger electron spectroscopy analyzer, and obtained results may be averaged to calculate the Co/Ni value (at % of Co/at % of Ni). Note also that at % values of Ni and Co may be measured with the estimation that, among peaks obtained by the measurement using a scanning-type Auger electron spectroscopy analyzer, peaks within a range of 820 to 850 eV represent the peak of Ni, peaks within a range of 570 to 600 eV represent the peak of Fe, peaks within a range of 620 to 650 eV represent the peak of Co, and the sum of these Ni, Fe, and Co is 100 at %.

In the surface-treated steel sheet for battery cases according to the present invention, in addition to the feature that the Co/Ni value as determined by Auger electron spectroscopy analysis is within the above certain range, it is preferred that an immersion potential of the nickel-cobalt alloy layer in potassium hydroxide aqueous solution at 60° C. is within a range of −0.4 to −0.02 V relative to an immersion potential of a nickel simple body in potassium hydroxide aqueous solution at 60° C. That is, the difference from the immersion potential of a nickel simple body in potassium hydroxide aqueous solution is preferably within the above range.

According to the present invention, in addition to the feature that the Co/Ni value as determined by Auger electron spectroscopy analysis is within the above certain range, the immersion potential in potassium hydroxide aqueous solution may be within the above range thereby to effectively and significantly improve the resistance to dissolving in alkaline solution, such as potassium hydroxide solution, as a strong alkaline electrolyte. If the immersion potential is unduly low (if the difference from the immersion potential of a nickel simple body is unduly large), then the nickel-cobalt alloy layer may have poor resistance to dissolving in alkaline solution thereby to cause dissolution of cobalt when being contacted with alkaline solution, so that the gas generation will be significant after a lapse of time. On the other hand, if the immersion potential is unduly high (if the difference from the immersion potential of a nickel simple body is unduly small), then the conductivity of the nickel-cobalt alloy layer may deteriorate, thus negatively affecting the battery properties.

Note that, in the present invention, the immersion potential of the nickel-cobalt alloy layer in potassium hydroxide aqueous solution may be represented by a spontaneous potential of the nickel-cobalt alloy layer measured in potassium hydroxide aqueous solution of 10 mol/L, for example. Specific measurement method may be such that the measurement is conducted under a condition of measurement temperature of 60° C. using potassium hydroxide aqueous solution of 10 mol/L as the electrolytic solution with a reference electrode: Ag/AgCl and a counter electrode: Pt, thereby to measure the spontaneous potential relative to Ag/AgCl and obtain a difference between the obtained spontaneous potential and a spontaneous potential of a Ni single body to Ag/AgCl.

As the method for forming the nickel-cobalt alloy layer in the present invention, this not particularly limited, but the methods below may be mentioned, for example. That is, first method may be a method of forming a nickel-cobalt alloy plated layer on the surface of a steel sheet using a nickel-cobalt alloy plating bath in which the cobalt/nickel ratio falls within a predetermined range. Alternatively, second method may be a method of forming a nickel-cobalt alloy plated layer on the surface of a steel sheet using a nickel-cobalt alloy plating bath, followed by heat treatment for thermal diffusion. Further, third method may be a method of forming a nickel plated layer and a cobalt plated layer in this order on the surface of a steel sheet, followed by heat treatment for thermal diffusion. Note, however, that the method for forming the nickel-cobalt alloy layer in the present invention is not particularly limited to the above first to third methods.

When the above first method is used to form the nickel-cobalt alloy layer, it is preferred that the nickel-cobalt alloy plating bath to be used is a plating bath based on a Watts bath prepared to contain nickel sulfate, nickel, chloride, cobalt sulfate, and boric acid. Note that the cobalt/nickel ratio in the plating bath is preferably within a range of 0.1 to 3.0 in terms of the molar ratio of cobalt/nickel, and more preferably within a range of 0.4 to 2.4. For example, in the case of using a plating bath based on a Watts bath prepared to contain nickel sulfate, nickel chloride, cobalt sulfate, and boric acid, a plating bath can be used in which components are appropriately adjusted within respective ranges of nickel sulfate: 10 to 300 g/L, nickel chloride: 20 to 60 g/L, cobalt sulfate: 10 to 250 g/L, and boric acid: 10 to 40 g/L so that the cobalt/nickel ratio falls within the above certain range. In addition, the nickel-cobalt alloy plating is preferably conducted under such a condition that the bath temperature is within a range of 40° C. to 80°, the pH is within a range of 1.5 to 5.0, and the current density is within a range of 1 to 40 A/dm$^2$, in which case the plating thickness may preferably range from 0.01 to 3.0 μm, more preferably from 0.05 to 2.0 μm, and furthermore preferably from 0.1 to 1.0 μm.

In the first method, before forming the nickel-cobalt alloy layer, nickel under-plating may be performed to form a nickel under-plated layer. The nickel under-plated layer may be formed using a commonly used Watts bath, and the thickness thereof is preferably within a range of 0.05 to 3.0 μm, and more preferably within a range of 0.1 to 2.0 μm. Forming the nickel under-plated layer in the first method allows the surface-treated steel sheet for battery cases of the present invention to have the nickel layer and the nickel-cobalt alloy layer in this order on the steel sheet (Ni—Co/Ni/Fe).

When the above second method is used to form the nickel-cobalt alloy layer, a nickel-cobalt alloy layer before heat treatment is first formed using a plating bath based on a Watts bath prepared to contain nickel sulfate, nickel chloride, cobalt sulfate, and boric acid, as the nickel-cobalt alloy plating bath. The cobalt/nickel ratio in the plating bath is preferably within a range of 0.1 to 3.0 in terms of the molar ratio of cobalt/nickel, and more preferably within a range of 0.4 to 2.4. In addition, the nickel-cobalt alloy plating is preferably conducted under such a condition that the bath temperature is within a range of 40° C. to 80°, the pH is within a range of 1.5 to 5.0, and the current density is within a range of 1 to 40 A/dm$^2$, in which case the plating thickness may preferably range from 0.01 to 2.0 μm, and more preferably from 0.05 to 1.0 μm. Also in the second method, before forming the nickel-cobalt alloy layer, nickel under-plating may be performed to form a nickel under-plated layer. The nickel under-plated layer may be formed using a commonly used Watts bath, and the thickness thereof is preferably within a range of 0.05 to 3.0 μm, and more preferably within a range of 0.1 to 2.0 μm.

Heat treatment is then conducted for the steel sheet formed thereon with the nickel-cobalt alloy layer before heat treatment in the above manner to thereby perform treatment for thermal diffusion. Heat treatment in this case may be performed by any of continuous annealing method or batch-type annealing method, and the heat treatment condition may be appropriately selected depending on the cobalt/nickel ratio of the nickel-cobalt alloy plating bath to be used, the thickness of the nickel-cobalt alloy layer before heat treatment, and presence or absence of the nickel under-plated layer. If, for example, the continuous annealing is performed, then it is preferred that the heat treatment temperature is within a range of 600° C. to 900° C. and the heat treatment time is within a range of 3 to 120 seconds, while if the batch-type annealing is performed, then it is preferred that the heat treatment temperature is within a range of 400° C. to 700° C., the heat treatment time is within a range of 30 minutes to 12 hours, and the heat treatment atmosphere is non-oxidizing atmosphere or reducing protective gas atmosphere. Note that, if the heat treatment atmosphere is reducing protective gas atmosphere, then protective gas may preferably be used which comprises 75% hydrogen-25% nitrogen with high heat conductivity and which is generated by ammonia crack method referred to as hydrogen enriched annealing.

In the second method, the above treatment for thermal diffusion may be performed also to form an iron-nickel diffusion layer and/or an iron-nickel-cobalt diffusion layer between the steel sheet and the nickel-cobalt alloy layer, so that the surface-treated steel sheet for battery cases according to the present invention can be configured to have the iron-nickel diffusion layer and/or iron-nickel-cobalt diffusion layer and the nickel-cobalt alloy layer in this order on the steel sheet (Ni—Co/Fe—Ni and/or Ni—Co—Fe/Fe). Alternatively, in the case of forming the nickel under-plated layer in the second method, the thickness of the nickel under-plated layer and the heat treatment condition may be adjusted so that the surface-treated steel sheet for battery cases according to the present invention can be configured to have the iron-nickel diffusion layer and the nickel-cobalt alloy layer in this order on the steel sheet (Ni—Co/Fe—Ni/Fe) or to have the iron-nickel diffusion layer, the nickel layer, and the nickel-cobalt alloy layer in this order on the steel sheet (Ni—Co/Ni/Fe—Ni/Fe).

When the above third method is used to form the nickel-cobalt alloy layer, a nickel plating bath is first used to form a nickel plated layer on the surface of a steel sheet. The nickel plating bath to be used may be a plating bath, such as Watts bath, sulfamate bath, borofluoride bath, or chloride bath, which is commonly used for nickel plating. For example, the nickel plated layer may be formed using Watts bath with a bath composition of nickel sulfate: 200 to 350 g/L, nickel chloride: 20 to 60 g/L, and boric acid: 10 to 50 g/L under a condition that the pH is within a range of 1.5 to 5.0, the bath temperature is within a range of 40° C. to 80° C., and the current density is within a range of 1 to 40 A/dm$^2$. The thickness of the nickel plated layer preferably ranges from 0.05 to 3.0 μm, and more preferably from 0.1 to 2.0 μm.

Cobalt plating is then performed for the steel sheet formed thereon with the nickel plated layer, thereby forming a cobalt plated layer on the nickel plated layer. The cobalt plated layer may be formed, for example, using cobalt plating bath with a bath composition of cobalt sulfate: 200 to 300 g/L, cobalt chloride: 50 to 150 g/L, and sodium chloride: 10 to 50 g/L under a condition that the pH is within a range of 2 to 5, the bath temperature is within a range of 40° C. to 80° C., and the current density is within a range of 1 to 40 A/dm$^2$. The thickness of the cobalt plated layer preferably ranges from 0.01 to 2.0 μm, and more preferably from 0.05 to 1.0 μm.

Heat treatment is then conducted for the steel sheet formed thereon with the nickel plated layer and the cobalt plated layer to thermally diffuse the nickel plated layer and the cobalt plated layer thereby performing treatment for forming the nickel-cobalt alloy layer. Heat treatment in this case may be performed by any of continuous annealing method or batch-type annealing method, and the heat treatment condition may be appropriately selected depending on the thickness of the nickel plated layer and the thickness of the cobalt plated layer before heat treatment. If, for example, the continuous annealing is performed, then it is preferred that the heat treatment temperature is within a range of 600° C. to 900° C. and the heat treatment time is within a range of 3 to 120 seconds, while if the batch-type annealing is performed, then it is preferred that the heat treatment temperature is within a range of 400° C. to 700° C., the heat treatment time is within a range of 30 minutes to 12 hours, and the heat treatment atmosphere is non-oxidizing atmosphere or reducing protective gas atmosphere. Note that the heat treatment atmosphere may preferably be performed by using protective gas which comprises 75% hydrogen-25% nitrogen like in the above second method.

In the third method, the above treatment for thermal diffusion may be performed also to form an iron-nickel diffusion layer between the steel sheet and the nickel layer, so that the surface-treated steel sheet for battery cases according to the present invention can be configured to have the iron-nickel diffusion layer, the nickel layer, and the nickel-cobalt alloy layer in this order on the steel sheet (Ni—Co/Ni/Fe—Ni/Fe). In the third method, a certain condition of the thickness of the nickel plated layer or heat treatment allows the nickel layer to be completely thermally diffused, in which case the surface-treated steel sheet for battery cases according to the present invention can be configured to have the iron-nickel diffusion layer and the nickel-cobalt alloy layer in this order on the steel sheet (Ni—Co/Fe—Ni/Fe).

In the above manner, the surface-treated steel sheet for battery cases according to the present invention can be obtained by forming the above certain nickel-cobalt alloy layer on the steel sheet. The surface-treated steel sheet for battery cases according to the present invention is configured to be formed with the above certain nickel-cobalt alloy layer, and thus has excellent resistance to dissolving in alkaline solution and can ensure high battery properties even after a lapse of time.

<Battery Case>

The battery case according to the present invention can be obtained using the above surface-treated steel sheet for battery cases according to the present invention. More specifically, the battery case according to the present invention is configured by forming the above surface-treated steel sheet for battery cases according to the present invention via drawing, ironing, DI or DTR forming so that the nickel cobalt alloy layer is located at the inner surface side of the case.

The battery case according to the present invention is formed using the above surface-treated steel sheet for battery cases according to the present invention thereby to have excellent resistance to dissolving in alkaline solution and achieve high battery properties comparable with or higher than those of prior art even after a lapse of time, and can thus be preferably used as a battery case for batteries, such as alkaline batteries and nickel hydride batteries, which employ strong alkaline electrolyte. Specifically, the battery case according to the present invention may be filled with each material that constitutes electric generating elements, such as positive electrode mixture, negative electrode active material, and alkaline electrolytic solution, and a battery can thereby be obtained.

EXAMPLES

The present invention will hereinafter be specifically described with reference to examples, but the present invention is not limited to these examples.

Note that the definition and evaluation method for each property are as follows.

<Co/Ni Value>

The nickel-cobalt alloy layer of the surface-treated steel sheet was etched from the outermost surface to a depth of about 10 nm, and five locations on the surface-treated steel sheet after etching were subjected to measurement of at % of Ni and Co using a scanning-type Auger electron spectroscopy (AES) analyzer thereby to obtain Co/Ni values as determined by Auger electron spectroscopy analysis.

<Immersion Potential>

The surface-treated steel sheet was immersed in potassium hydroxide aqueous solution of 10 mol/L, and measurement of an inversion potential of the nickel-cobalt alloy layer in the potassium hydroxide aqueous solution was conducted, under a condition of a reference electrode: Ag/AgCl, a counter electrode: Pt, and a measurement temperature of 60° C., by measuring a spontaneous potential of the nickel-cobalt alloy layer relative to the Ag/AgCl and obtaining a difference between the obtained spontaneous potential and a spontaneous potential of a Ni single body to Ag/AgCl.

<Cobalt Residual Ratio>

After immersing the surface-treated steel sheet in potassium hydroxide aqueous solution of 10 mol/L and maintaining them in a constant-temperature oven at 60° C. during 20 days, measurement of a cobalt residual ratio was conducted by measuring contents of cobalt in the nickel-cobalt alloy layer before and after the immersion in the potassium hydroxide aqueous solution using X-ray fluorescence. Note that a higher cobalt residual ratio shows that cobalt is prevented from dissolving into the potassium hydroxide aqueous solution, and the resistance to dissolving in alkaline solution can be determined as being more excellent.

<Gas Generation Amount>

An LR6 battery case (JIS) was prepared using the surface-treated steel sheet so that the nickel-cobalt alloy layer was located at the inner surface side of the battery case. A battery was then produced by inserting a positive electrode pellet, a separator, and negative electrode gel configured to contain potassium hydroxide aqueous solution of 10 mol/L into the inside of the obtained battery case and swaging a negative electrode cap. Thereafter, the obtained battery was maintained in a constant-temperature oven at 60° C. during 20 days and then subjected to discharging, and the amount of gas generated in the battery was measured for the battery maintained during 20 days and discharged. The amount of generated gas was measured by opening the battery maintained during 20 days and discharged, while it was immersed in water, thereby to collect the gas generated and accumulated in the battery.

Example 1

As an original sheet, a steel sheet which was obtained by annealing a cold-rolled sheet (thickness of 0.25 mm) of low-carbon aluminum-killed steel having a chemical composition as below was prepared.

C: 0.045 wt %, Mn: 0.23 wt %, Si: 0.02 wt %, P: 0.012 wt %, F: 0.009 wt %, Al: 0.063 wt %, N: 0.0036 wt %, and remainder: Fe and inevitable impurities.

The prepared steel sheet was then subjected to alkaline electrolytic degreasing and acid pickling of sulfuric acid immersion, followed by nickel plating under the condition below to form a nickel plated layer of thickness of 1.0 μm, and then a surface-treated steel sheet was obtained by performing nickel-cobalt alloy plating under the condition below to form a nickel-cobalt alloy layer of thickness of 0.2 µm on the nickel plated layer.

<Nickel Plating>

Bath composition: nickel sulfate of 250 g/L, nickel chloride of 45 g/L, and boric acid of 30 g/L pH: 3.5-5.0

Bath temperature: 60° C.

Current density: 10 A/dm$^2$

<Nickel-Cobalt Alloy Plating>

Bath composition: containing nickel sulfate, nickel chloride, cobalt sulfate, cobalt chloride, and boric acid with a molar ratio of cobalt/nickel of 0.11 pH: 3.5-5.0

Bath temperature: 60° C.

Current density 10 A/dm$^2$

Further, for the surface-treated steel sheet obtained in such a manner, the above methods were conducted to perform each evaluation of the Co/Ni value as determined by Auger electron spectroscopy analysis, the immersion potential in potassium hydroxide aqueous solution, the cobalt residual ratio, and the gas generation amount. Results are listed in Table 1.

Examples 2 to 6

Surface-treated steel sheets each provided with the nickel plated layer and the nickel-cobalt alloy layer on a steel sheet was obtained like in Example 1 except for using different plating baths prepared to conduct nickel-cobalt alloy plating, i.e., plating baths with molar ratio of cobalt/nickel of 0.24 (Example 2), 0.41 (Example 3), 0.80 (Example 4), 1.38 (Example 5), and 1.90 (Example 6), and evaluation was conducted in a similar manner. Results are listed in Table 1.

Example 7

The nickel plated layer and the nickel-cobalt alloy layer were firmed on a steel sheet like in Example 1 except for using different plating bath prepared to conduct nickel-cobalt alloy plating, i.e., plating bath with a molar ratio of cobalt/nickel of 0.24, followed by heat treatment, as batch-type annealing, under the condition of a temperature of 600° C., 1 minute, and non-oxidizing atmosphere to perform thermal diffusion treatment for the nickel plated layer and the nickel-cobalt alloy layer, and a surface-treated steel sheet was thus obtained, for which evaluation was conducted in a similar manner. Results are listed in Table 1.

Example 8

A surface-treated steel sheet was obtained like in Example 7 except for changing the heat treatment temperature to 800° C., and evaluation was conducted in a similar manner. Results are listed in Table 1.

Example 9

A surface-treated steel sheet was obtained like in Example 7 except for using different plating bath prepared to conduct nickel-cobalt alloy plating, i.e., plating bath with a molar ratio of cobalt/nickel of 0.91, and evaluation was conducted in a similar manner. Results are listed in Table 1.

Example 10

A surface-treated steel sheet was obtained like in Example 9 except for changing the heat treatment temperature to 800° C., and evaluation was conducted in a similar manner. Results are listed in Table 1.

Example 11

A steel sheet was prepared like in Example 1, then nickel plating was performed for the prepared steel sheet to form a nickel plated layer of a thickness of 1.0 µm like in Example 1, followed by cobalt plating under the condition below to form a cobalt plated layer of a thickness of 0.2 µm on the nickel plated layer, and a surface-treated steel sheet formed thereon with the nickel plated layer and the cobalt plated layer was obtained.

<Cobalt Plating>

Bath composition: cobalt sulfate of 250 g/L, cobalt chloride of 90 g/L, and boric acid of 30 g/L pH: 3.5-5.0

Bath temperature: 60° C.

Current density: 10 A/dm$^2$

Further, the obtained plated steel sheet was subjected to heat treatment, as batch-type annealing, under the condition of a temperature of 700° C., 1 hour, and non-oxidizing atmosphere to perform thermal diffusion treatment for the nickel plated layer and the cobalt plated layer, and a surface-treated steel sheet was thus obtained, for which evaluation was conducted in a similar manner. Results are listed in Table 1.

Comparative Example 1

A surface-treated steel sheet was obtained like in Example 1 except for not forming a nickel-cobalt alloy layer, and evaluation was conducted in a similar manner. Results are listed in Table 1.

Comparative Examples 2 and 3

Surface-treated steel sheets each provided with the nickel plated layer and the nickel-cobalt alloy layer on a steel sheet was obtained like in Example 1 except for using different plating baths prepared to conduct nickel-cobalt alloy plating, i.e., plating baths with molar ratio of cobalt/nickel of 3.36 (Comparative Example 2) and 7.82 (Comparative Example 3), evaluation was performed in a similar manner. Results are listed in Table 1.

Comparative Example 4

A surface-treated steel sheet formed thereon with the nickel plated layer and the cobalt plated layer was obtained like in Example 11 except for not performing heat treatment, and evaluation was conducted in a similar manner. Results are listed in Table 1.

Comparative Example 5

A surface-treated steel sheet was obtained like in Example 11 except for changing the heat treatment temperature to 600° C. and the heat treatment time to 1 minute at the time of performing heat treatment, and evaluation was conducted in a similar manner. Results are listed in Table 1.

TABLE 1

| | Molar ratio Co/Ni in plating bath | Heat treatment condition | Immersion potential difference to Ni single body in KOH (V) | Co/Ni value as determined by Auger electron spectroscopy analysis | Co residual ratio after 60° C. × 20 days in KOH (wt %) | Gas generation amount in battery (cc) |
|---|---|---|---|---|---|---|
| Example 1 | 0.11 | None | −0.05 | 0.15 | 100 | 2.9 |
| Example 2 | 0.24 | None | −0.1 | 0.22 | 100 | 2.8 |
| Example 3 | 0.41 | None | −0.25 | 0.25 | 100 | 2.7 |
| Example 4 | 0.80 | None | −0.29 | 0.33 | 90 | 2.7 |
| Example 5 | 1.38 | None | −0.33 | 0.42 | 80 | 2.6 |
| Example 6 | 1.99 | None | −0.39 | 1.2 | 60 | 2.8 |
| Example 7 | 0.24 | 600° C. × 1 min. | −0.06 | 0.17 | 100 | 2.8 |
| Example 8 | 0.24 | 800° C. × 1 min. | −0.02 | 0.14 | 100 | 2.9 |
| Example 9 | 0.91 | 600° C. × 1 min. | −0.14 | 0.23 | 100 | 2.7 |
| Example 10 | 0.91 | 800° C. × 1 min. | −0.07 | 0.2 | 100 | 2.9 |
| Example 11 | — | 700° C. × 1 hour | −0.37 | 0.65 | 70 | 2.8 |
| Comparative Example 1 | — | None | 0 | — | — | 3.4 |
| Comparative Example 2 | 3.36 | None | −0.47 | 2.5 | 10 | 3.2 |
| Comparative Example 3 | 7.82 | None | −0.5 | 3.2 | 1 | 3.2 |
| Comparative Example 4 | — | None | −0.58 | 4 | 0 | 3.3 |
| Comparative Example 5 | — | 600° C. × 1 min. | −0.45 | 2.1 | 20 | 3.0 |

TABLE 2

| | Immersion potential difference to Ni single body in KOH (V) | Co/Ni value as determined by Auger electron spectroscopy analysis | Short circuit current (SCC) after 60° C. × 20 days (A) |
|---|---|---|---|
| Example 6 | −0.39 | 1.2 | 6.3 |
| Example 10 | −0.07 | 0.2 | 6.7 |
| Example 11 | −0.37 | 0.65 | 6.0 |
| Comparative Example 1 | 0 | — | 4.0 |
| Comparative Example 4 | −0.58 | 4 | 6.0 |
| Comparative Example 5 | −0.45 | 2.1 | 5.8 |

As shown in Table 1, according to Examples 1 to 11 in which the Co/Ni value at the surface of the nickel-cobalt alloy layer was within a range of 0.1 to 1.5 as determined by Auger electron spectroscopy analysis, successful results were achieved such that the residual ratio of cobalt after immersion in potassium hydroxide aqueous solution was high, i.e., 60% or more, and the gas generation amount in the battery was suppressed. In addition, according to Examples 1 to 11, the immersion potential in potassium hydroxide aqueous solution relative to that of a nickel simple body was within a range of −0.4 to −0.02 V.

In contrast, according to Comparative Examples 1 and 4 in which any nickel-cobalt alloy layer was not formed on the outermost surface and Comparative Examples 2, 3, and 5 in which the Co/Ni value at the surface of the nickel-cobalt alloy layer exceeded 1.5 as determined by Auger electron spectroscopy analysis, results were such that the residual ratio of cobalt after immersion in potassium hydroxide aqueous solution was low, i.e., 20% or less, and the gas generation amount in the battery was large.

In addition, batteries were prepared like in the above evaluation of "gas generation amount" using surface-treated steel sheets prepared in Examples 6, 10, and 11 and Comparative Examples 1, 4, and 5, and maintained in a constant-temperature oven at 60° C. during 20 days and then subjected to discharging, followed by measurement of short circuit current (SCC). As shown in Table 2, successful results were achieved such that the short circuit current (SCC) in each of Examples 6, 10, and 11 was comparable with or larger than that of Comparative Example 4 having a cobalt layer at the outermost surface.

The invention claimed is:

1. A surface-treated steel sheet for battery cases, comprising:
 a nickel-cobalt binary alloy layer formed at the outermost surface of a plane to be an inner surface of a battery case; and
 an iron-nickel diffusion layer and/or an iron-nickel-cobalt diffusion layer between the nickel-cobalt binary alloy layer and a steel sheet,
 wherein the nickel-cobalt binary alloy layer is formed by performing a heat treatment for thermal diffusion after forming a nickel-cobalt alloy plated layer on the steel sheet or by performing a heat treatment for thermal diffusion after forming a nickel plated layer and a cobalt plated layer in this order on the steel sheet,
 wherein a Co/Ni value at the surface of the nickel-cobalt binary alloy layer is within a range of 0.2 to 0.8 as determined by Auger electron spectroscopy analysis, and
 wherein an immersion potential of the nickel-cobalt binary alloy layer in potassium hydroxide aqueous solution at 60° C. is within a range of −0.4 to −0.02 V relative to an immersion potential of a nickel simple body in potassium hydroxide aqueous solution at 60° C.

2. The surface-treated steel sheet for battery cases as set forth in claim 1, further comprising a nickel layer as an underlying layer for the nickel-cobalt binary alloy layer.

3. A battery case obtained by shape-forming the surface-treated steel sheet for battery cases as set forth in claim 1.

4. A battery configured using the battery case as set forth in claim 3.

* * * * *